2,881,837

METHOD OF FRACTURING OIL WELLS

John G. Staudt, Tulsa, Okla., assignor to The Dow Chemical Company, Midland, Mich., a corporation of Delaware No Drawing. Application June 25, 1953
Serial No. 364,181

3 Claims. (Cl. 166—22)

The invention relates to the treatment of wells particularly those drilled into an oil- or gas-bearing formation. It more particularly concerns an improved method of facilitating the flow of oil or gas to a well from an earth formation penetrated by the well.

Some conventional methods currently in use for facilitating the flow of oil and gas from an earth formation to a well hole formed therein involve the injection of a liquid into the earth, the injection being made under sufficient pressure to produce cracks or fractures therein by hydraulic action. A liquid oftentimes used for the purpose is oil preferably having a higher viscosity than most crude oils. The fractures or cracks thus produced are propped open by including in the fracturing liquid a quantity of sand which remains in the fractures after the injection pressure is released. A disadvantage of facilitating the production of oil or gas from the earth by such methods is that water-bearing formations contiguous to those bearing oil or gas may be and oftentimes are also fractured and propped open. And such fracturing generally results in facilitating the flow of water or brine to the well, a result which is highly undesirable.

Accordingly, the principal object of the invention is to provide a method of hydraulically fracturing oil- and gas-bearing formations which may be contiguous to water- or brine-bearing formations so as to facilitate oil or gas flow to the well with reduced or eliminated risk of also greatly facilitating the flow of water or brine to the well.

The invention is predicated upon the discovery that by including in the fracturing liquid as a propping agent, instead of sand, fragmented particles which are insoluble in the fracturing liquid but soluble in water- or brine-, oil- or gas-bearing formations may be fractured and the fractures propped open without permanently propping open fractures which also may be formed in contiguous water- or brine-bearing formations.

The invention then consists of the improved method of facilitating the flow of oil or gas from an earth formation into a well therein drilled. Other objects and advantages of the invention will become apparent as the description of the invention proceeds.

In carrying out the invention, a fracturing liquid is used which is a non-solvent for the particulated propping material used. Hence, the choice of the liquid is determined by the properties of the propping material, and the availability, and cheapness of the liquid with which fracturing is to be accomplished. The properties of the propping material, as already indicated, must include water- or brine-solubility so that when the propping material is lodged in fractures, admitting water or brine to the well, the propping material will be dissolved therein sooner or later thus preventing permanent propping action taking place in such fractures. It is manifest that in the case of oil and gas wells, the preferred fracturing liquid to use is any crude or refined petroleum oil which can be injected into the earth formations through the well bore. In the case of the use of a petroleum oil as the fracturing liquid most water-soluble inorganic salts in particulated form may be used therewith as they are generally substantially insoluble in petroleum oils. For example, alkali metal and alkali earth metal and ammonium halides may be used. Of these salts, sodium chloride is generally to be preferred. The particle size of the propping material does not appear to be sharply critical and may range, for example, from sizes passing through a No. 6 standard sieve to sizes which are just retained upon a No. 60 standard sieve. Suitable proportions of the particulated water- or brine-soluble propping agent are from about ½ to 5 pounds thereof per gallon of the fracturing liquid, although other proportions may be used, e.g. 0.1 to 8 pounds per gallon.

In carrying out the treatment of a well, the particulated propping material is mixed with the fracturing liquid, chosen in accordance with the requirements of the invention, in any convenient manner as by agitating a charge of the fracturing liquid while dropping into it the particulated propping agent. A generally convenient method is to introduce a stream of the particulated water-soluble propping material into a mixing zone, such as the space in an open top vessel, while introducing into the zone a stream of the fracturing liquid and subjecting the liquid and propping material to a stirring action as by means of a motor driven propeller immersed in the mixing zone. At the same time, the resulting mixture as it forms may be withdrawn from the mixing zone, as by a force pump, and introduced into the well. In this way, the preparation of the mixture of fracturing liquid and propping material and its introduction into the earth formation is a continuous operation.

The injection into the earth of the mixture of fracturing liquid and propping material is made at a rate sufficient to avoid undue segregation of the particles of propping material from the fracturing liquid after the mixture leaves the mixing zone. Velocities of the mixture, as it travels from the mixing zone through the well into the earth formation, should preferably exceed those at which the propping material settles through a column of the fracturing liquid with which the propping material is mixed.

The injection of the mixture of the fracturing liquid and the water- or brine-soluble propping material is made at a rate sufficient to develop within the well a pressure calculated to be high enough to bring about a breaking down or fracturing of the earth formation. The pressures required for fracturing are generally evident on carrying out the treatment and may be ascertained if desired while the injection is being made. Fracturing pressures are evident as a more or less sudden drop in the injection pressure while the mixture of fracturing liquid and propping material is being injected into the earth. If too low a rate of injection is employed, the particles of propping material merely become deposited in the well hole instead of being carried into cracks and fractures formed by the hydraulic jacking action of the fracturing liquid. After fracturing occurs, the pressure declines more or less suddenly, as aforesaid, and then the pressure required to maintain the injection at the same rate as that before fracturing occurs is noticeably less. Large amounts of fracturing liquid and propping material may then be injected, if desired, without significant changes in pressure. Thus, the attainment of the formation breakdown pressure which results in fracturing is readily recognized during the injection and is in general at least substantially equal to the weight per unit area of the formation above the zone into which the injection is made. The injection pressure at the head of the well may exceed the formation breakdown pressure as additional pressure is supplied at the well head beyond that equivalent to the weight per unit area of the overburden in order to overcome fluid friction losses and in some cases also additional pressure is required to part the rock or earth formation. In all instances, however, there is a more or less sudden decline in pressure during the course of the attainment of the breakdown of the formation with the resultant creation and extension therein of fractures.

The viscosity of the fracturing liquid is not sharply critical but it is manifest that the particulated propping material more readily remains in suspension the more viscous the fracturing liquid. Hence, it is desirable to use as fracturing liquids those which are pumpable but whose viscosity is substantial. As aforesaid, crude oil may be used but liquids having a viscosity of more than about 10 centipoises are more desirable, such as some oil refinery products, e.g., lubricating oils, green oil, cycle oil bottoms, some fuel oils. Fracturing liquids having viscosities as high as 5000 centipoises and even higher may be used. Relatively thin oils may be thickened if desired to increase their viscosity as understood in the art.

In carrying out a well treatment in accordance with the invention, it is generally desirable to confine the fracturing liquid-propping material mixture in the well to a zone opposite the formation which is to be fractured. This may be accomplished by lowering into the well a string of tubing carrying a packer which can be set in the hole, or casing if present, at a level just above the zone to be treated, as understood in the art, and injecting the mixture through the tubing into the formation below the packer.

The volume of fracturing liquid and propping agent to be injected is not critical but may be arbitrarily chosen provided enough be used to bring about the breakdown of the formation. Amounts in the order to 500 to 5000 gallons are generally sufficient but other amounts may be used. It is generally desirable to use a chaser of the fracturing liquid alone (without the propping material) after the injection to clear the well of the mixture. For this purpose, there may be injected into the well a volume of chaser more or less equal to that of the well bore or space within the tubing or casing, as the case may be.

As soon as a sufficient volume of the charge of fracturing liquid and water or brine-soluble propping material has been injected into the earth formation so as to achieve its fracturing, an additional volume of the fracturing liquid alone may be injected to ensue adequate deposition in the fractures of the propping material. This may be followed by a further amount of the fracturing liquid alone for a chaser as already mentioned if needed.

Measurements made with a weighted line lowered into the well bore after an injection of the mixture of the fracturing liquid and the propping material have shown that the propping material is not deposited in the well hole but is carried by the fracturing liquid into the earth formation and remains there after the injection pressure is released when a sufficient rate of injection is used. In most instances, it is desirable to displace the whole charge of fracturing liquid and propping material into the earth formation from the well hole, although breakdown or fracturing of the formation and the propping open of the non-water or brine-bearing formations can be achieved even though some of the charge still remains in the well hole.

After the injection of fracturing liquid-propping material mixture and the chaser, if used, the injection pressure is released allowing the formation fluids to purge the fracturing liquid from the formation while the propping material remains in the fractures. Water or brine may be induced to enter the well as a result of the fracturing operation but in time the propping material, being water- or brine-soluble, is washed out allowing the fractures bearing water or brine to close up, thereby more or less shutting off these unwanted aqueous liquids from entering the well.

I claim:

1. The method of treating an oil- or gas-bearing earth formation penetrated by the bore of a well so as to fracture the oil- or gas-bearing formations and prop open the fractures without permanently propping open fractures which may be produced in a water- or brine-bearing formation contiguous to the oil- or gas-bearing formation which comprises injecting into the well bore and thence into the earth formations penetrated by the well bore a mixture comprising a non-aqueous fracturing liquid and as the sole propping material a solid water-soluble particulated solid insoluble in the said fracturing liquid in the proportions of about 0.1 to 8 pounds of the particulated solid per gallon of the fracturing liquid, the particles being small enough to pass through a No. 6 standard sieve and large enough not to pass through a No. 60 standard sieve, the injection being made at a rate sufficient to raise the pressure on the mixture in the well bore to at least the breakdown pressure of the oil- or gas-bearing formation to thereby fracture the same, continuing the injection after the breakdown pressure is attained until at least a portion of the mixture in the well hole is displaced therefrom into the adjacent earth formation, and forthwith putting the well into production.

2. The method according to claim 1 in which the fracturing liquid is a petroleum oil and the propping material is a particulated water-soluble halide.

3. The method according to claim 2 in which the water-soluble halide is sodium chloride.

References Cited in the file of this patent

UNITED STATES PATENTS

| 2,645,291 | Voorhees | July 14, 1953 |
| 2,667,224 | Howard | Jan. 26, 1954 |
| 2,734,861 | Scott et al. | Feb. 14, 1956 |